United States Patent [19]
Oleskevich et al.

[11] Patent Number: 6,073,465
[45] Date of Patent: Jun. 13, 2000

[54] METHOD INCLUDING MAKING GROOVES IN A FIBER PREFORM WHICH IS DRAWN TO CREATE FIBER WITH IMPROVED MODE COUPLING DUE TO A RESULTANT WANDERING OF THE CORE

[75] Inventors: Tanya Oleskevich; Peter G. Berrang, both of Victoria, Canada

[73] Assignee: SDL, Inc., San Jose, Calif.

[21] Appl. No.: 09/010,950

[22] Filed: Jan. 22, 1998

Related U.S. Application Data

[62] Division of application No. 08/848,324, Apr. 30, 1997, Pat. No. 5,790,735, which is a continuation of application No. 08/522,500, Aug. 31, 1995, abandoned.

[51] Int. Cl.[7] ............................................. C03B 37/027
[52] U.S. Cl. ........................ 65/390; 65/403; 65/402; 65/433
[58] Field of Search ............................ 65/402, 403, 390, 65/433

[56] References Cited

U.S. PATENT DOCUMENTS

| | | | |
|---|---|---|---|
| 3,535,018 | 10/1970 | Vasilatos | 65/420 |
| 3,666,348 | 5/1972 | Marcatili | 350/96 |
| 3,687,514 | 8/1972 | Miller et al. | 385/28 |
| 3,805,186 | 4/1974 | Woodcock | 331/94.5 |
| 3,969,016 | 7/1976 | Kaiser et al. | 385/28 |
| 4,044,315 | 8/1977 | Snitzer | 331/94.5 |
| 4,049,413 | 9/1977 | French | 65/402 |
| 4,212,660 | 7/1980 | Maurer | 65/402 |
| 4,236,786 | 12/1980 | Keck | 350/96.15 |
| 4,372,645 | 2/1983 | Miler | 350/96.3 |
| 4,447,124 | 5/1984 | Cohen | 385/123 |
| 4,710,605 | 12/1987 | Presby | 65/402 |
| 4,741,586 | 5/1988 | Kim et al. | 385/28 |
| 4,780,877 | 10/1988 | Snitzer | 372/6 |
| 4,815,079 | 3/1989 | Snitzer et al | 372/6 |
| 4,829,529 | 5/1989 | Kafka | 372/6 |
| 4,978,377 | 12/1990 | Brehm | 65/403 |
| 5,027,079 | 6/1991 | Desurvire et al. | 372/6 |
| 5,035,477 | 7/1991 | Schlump | 385/38 |
| 5,077,087 | 12/1991 | Byer | 65/390 |
| 5,291,501 | 3/1994 | Hanna | 372/6 |
| 5,309,452 | 5/1994 | Ohishi et al. | 372/6 |
| 5,311,325 | 5/1994 | Pantell et al. | 372/6 |
| 5,411,566 | 5/1995 | Poole | 65/402 |
| 5,530,709 | 6/1996 | Waarts et al. | 372/6 |
| 5,533,163 | 7/1996 | Muendel | 385/126 |
| 5,873,925 | 2/1999 | DiGiovanni | 65/390 |

FOREIGN PATENT DOCUMENTS

| | | | |
|---|---|---|---|
| 0 320 990 A2 | 6/1989 | European Pat. Off. | H01S 3/06 |
| 58-216208 | 12/1983 | Japan | 65/402 |
| 60-241004 | 11/1985 | Japan | 65/402 |
| 61-36130 | 2/1986 | Japan | 65/403 |
| 4331738 | 11/1992 | Japan | 65/390 |

OTHER PUBLICATIONS

Zellmer et al., "High–power ew neodymium–doped fiber laser operating at 9.2 W with high beam quality" *Optics Letters*, vol. 20, No. 6, Mar. 15, 1995, pp. 578–580.

Bedo et al., "The effective absorption coefficient in double–clad fibres", *Optics Communication* 99, (1993) North Holland, pp. 331–335.

*Primary Examiner*—John Hoffmann

[57] ABSTRACT

A method of making a fiber having a single mode absorptive core whose position relative to the cross sectional plane of the inner multimode cladding varies along the length of the fiber. A groove or grooves are made in the outer cladding of the preform. When fiber is drawn from the grooved preform, the position of the core does not follow the centerline of the fiber; the position within the fiber varies in accordance with the grooves.

12 Claims, 3 Drawing Sheets

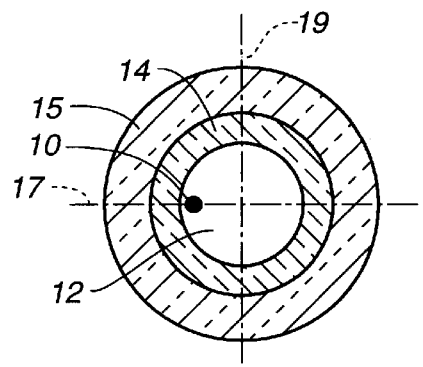
FIG._1A
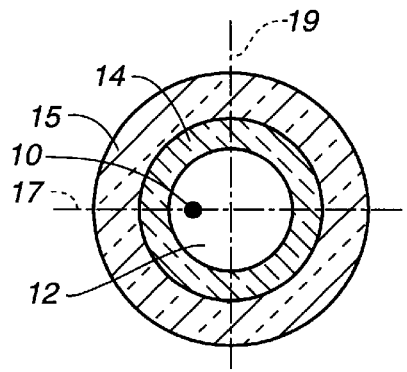
FIG._1B
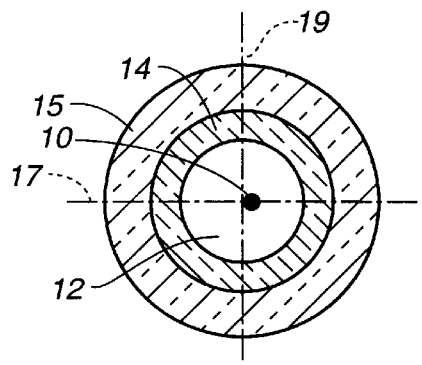
FIG._1C
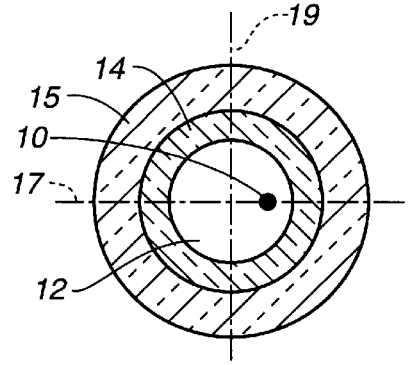
FIG._1D
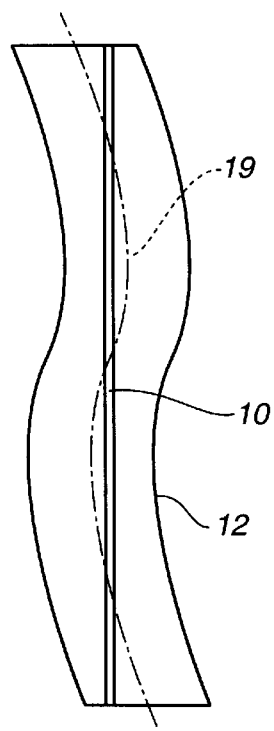
FIG._2
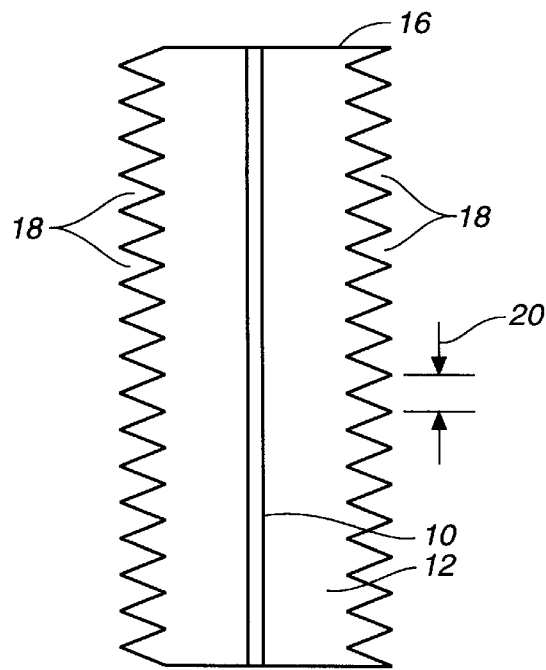
FIG._3

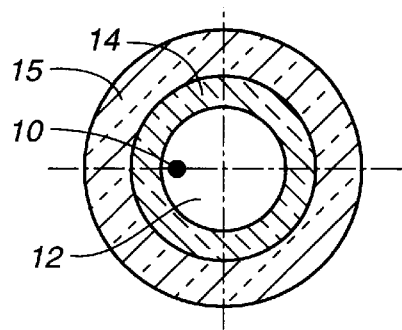
FIG._4A
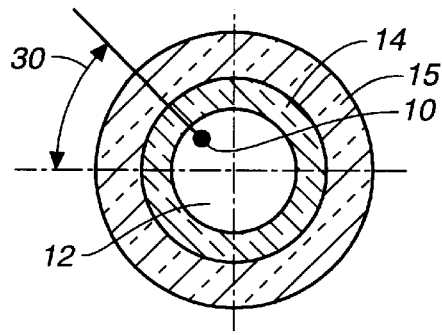
FIG._4B
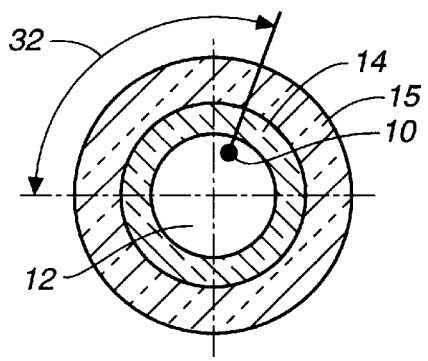
FIG._4C
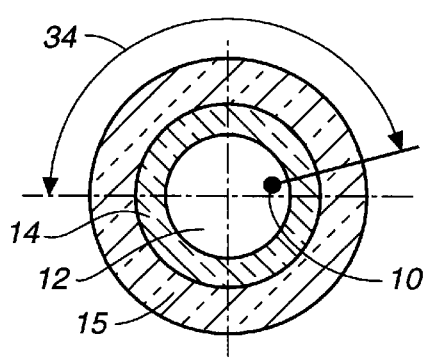
FIG._4D
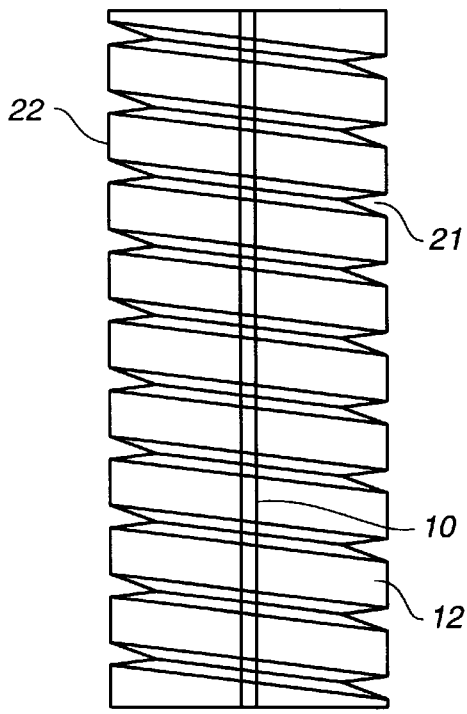
FIG._5

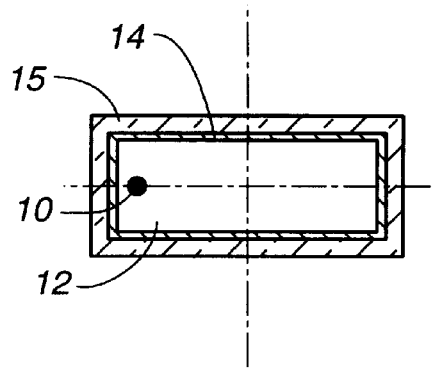
FIG._6A
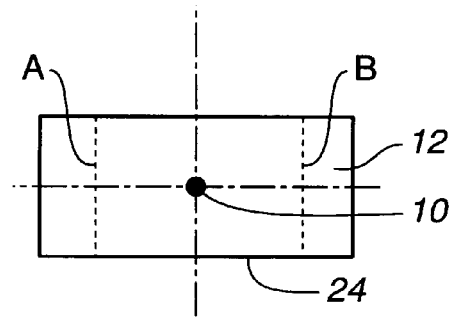
FIG._7B
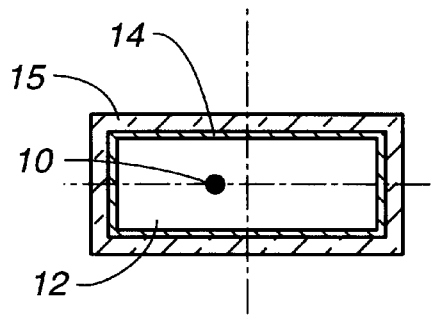
FIG._6B
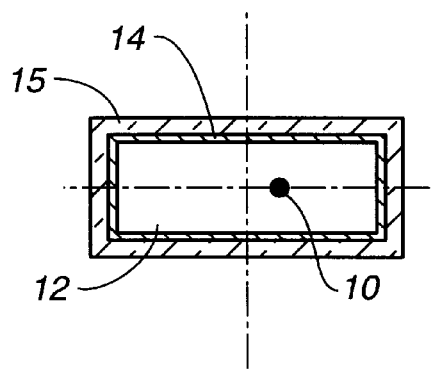
FIG._6C
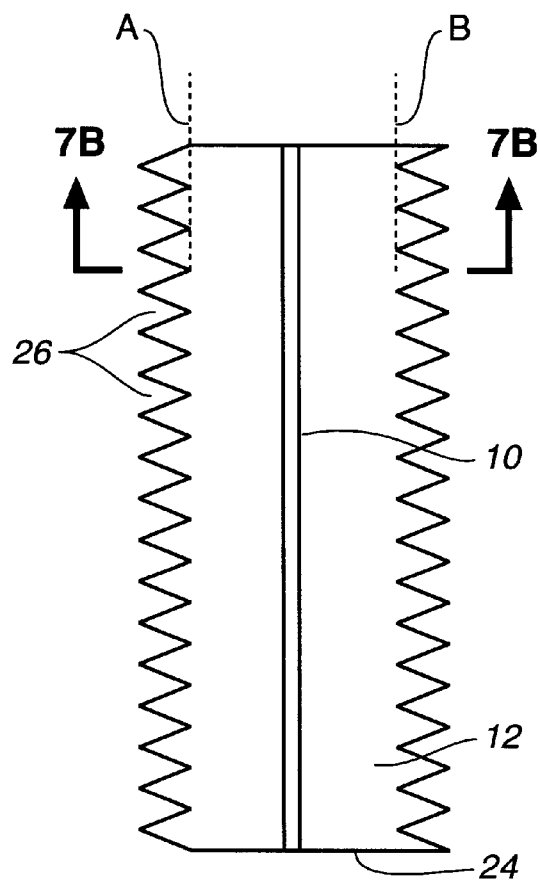
FIG._7A

METHOD INCLUDING MAKING GROOVES IN A FIBER PREFORM WHICH IS DRAWN TO CREATE FIBER WITH IMPROVED MODE COUPLING DUE TO A RESULTANT WANDERING OF THE CORE

This application is a division of patent application Ser. No. 08/848,324, filed Apr. 30, 1997, now U.S. Pat. No. 5,790,735, which is a continuation of patent application, Ser. No. 08/522,500, filed Aug. 31, 1995, abandoned.

TECHNICAL FIELD OF THE INVENTION

This invention relates to optical fibres. In particular, the invention relates to an improved structure for double-clad optical fibres designed to maximize the coupling of modes propagating in the multimode cladding into the core.

BACKGROUND OF THE INVENTION

A number of applications, such as biomedical and thermal printing applications, require high power laser sources (>1 Watt) in the near infrared region, as well as practical, flexible beam delivery systems. The maximum lasing power which can be extracted from a fibre laser source depends ultimately on the amount of pump radiation which can be coupled into the fibre laser cavity. The large emitting area and extreme aspect ratios (100 μm×1 μm) of high power stripe diodes available as pump sources typically result in unacceptably low coupling efficiencies of 10% into single mode fibre.

Double-clad optical fibres, consisting of a single mode core, an inner multimode cladding and a further cladding, offer improved coupling efficiency as the dimension of the inner cladding can be chosen to optimize coupling from the intended pump source. Up to 90% coupling efficiency has been achieved with double-clad fibres. In a typical double-clad fibre, a lasant-doped single mode core, having index of refraction $n_1$, is surrounded by a large inner multimode cladding with index of refraction $n_2<n_1$. This inner multimode cladding is then surrounded by a further layer, with index of refraction $n_3<n_2$, which confines radiation in the inner cladding and prevents scattering losses due to accumulation of dirt and humidity on the guiding interface. The pump radiation is transferred from the modes in the inner cladding to the absorptive, single mode core as they propagate along the length of the fibre. In this way several watts of pump power can eventually be completely absorbed by the lasant-doped single mode core and thus single mode lasing at much higher powers can be achieved using double-clad fibres. The double-clad fibre geometry essentially acts as a brightness converter on the order of the area ratio of the inner cladding to the core, which may be typically 400:1.

The overall lasing efficiency of fibre lasers made using double-clad fibre is not as high, however, as in conventional single-clad devices. The absorption of the pump light guided in the cladding is, in a first approximation, governed by Beer's law wherein the absorption coefficient of the doped core is reduced by the cladding/core area ratio. Experimental results have shown that the effective absorption coefficient of concentric circular double-clad fibre is only 5% of that predicted from the geometric area ratio of Beer's law. The reason for this is thought to be as follows. The strength of the absorption of a given mode depends on the field distribution of the mode at the position of the absorptive core. The higher the order of modes, the lower the field distribution at the centre of the inner cladding. For a double-clad fibre optimised for pumping by a broad stripe diode laser (typically 100 μm wide), the number of modes in the inner cladding is on the order of $10^5$, and only a small fraction of the field is propagating in the centre of the inner cladding and can thus be absorbed by the doped core. The radiation transfer from the multimode cladding to the single mode core is reduced by the number of modes propagating in the cladding which do not exhibit a local maxima at the location of the core. Typically, the cladding/core area ratio can be up to 400:1 and in this instance only 3% of the modes are absorbed by the single mode core (Bedö et al. in Optics Communications, 1993, pages 331–335).

It has also been shown by Bedö et al. that the absorption coefficient of double-clad fibre is non-linear with fibre length and may be up to three times larger for short lengths versus long lengths of fibre. This can be understood if one considers the modes propagating in the cladding as two ensembles, those that are absorbed by the core and those that are not, which are inter-related by a mixing parameter. The effective absorption coefficient for the double-clad fibre is then a function of the absorption coefficient, the mixing or power coupling coefficient, and the fraction of the ensemble of non-absorbing modes to the total power in the fibre. The small fraction of modes in the multimode cladding which initially do have local maxima at the position of the core are quickly depleted in a short distance by the highly absorptive core. This has the effect of increasing the relative fraction of non-absorbing modes, and thus reduces the effective absorption coefficient in the remaining length of fibre. The effective absorption of the double-clad fibre, after a characteristic length, is in fact lower than that predicted by considering only the geometric ratio of the areas of the core and cladding regions.

It has been recognized that the introduction of perturbations in the multimode cladding modes induces mode mixing and increases the radiation transfer from the inner cladding to the core. The conventional approach to achieving this effect has been to induce bends in the fibre. However, it is often the case that as many modes as are subsequently coupled into the ensemble of absorbed modes are also coupled into non-guided modes in the cladding and so are lost. The net effect is an only marginal increase in device performance. It has also been suggested to design a fibre with a constant offset of the single mode core from the geometric centre of the multimode cladding. This approach has had some success, however, it is still much less efficient than the 100% transfer efficiency inherent in traditional single-clad single mode fibre lasers in which the pump radiation and lasing mode are both guided in the same waveguide structure.

There remains a need to improve the overall efficiency of devices incorporating double-clad fibre geometries such as fibre lasers and amplifiers. It is therefore an objective of the invention to provide a structure for a double-clad optical fibre wherein there is improved coupling of the modes in the cladding to the core and thereby improve the performance of such devices.

SUMMARY OF THE INVENTION

The invention provides a double-clad fibre structure comprising a substantially single mode lasant-doped core, an inner multimode cladding surrounding the core, and an outer cladding surrounding the inner multimode cladding wherein the position of the core relative to the cross sectional plane of the inner cladding varies continuously, or "wanders", along the length of the fibre. As a result, a substantial amount of radiation in the cladding is coupled into the single mode core, and a continually renewed distribution of undepleted high order modes propagating in the inner cladding are coupled into the single mode core along the length of the fibre. Substantially all of the energy launched into the inner cladding may be absorbed in a shorter characteristic length of fibre in this wandering core configuration than in conventional double-clad fibre geometries.

BRIEF DESCRIPTION OF DRAWINGS

The invention may be more fully appreciated by reference to the detailed description of the preferred embodiment which follows and to the drawings, shown in exaggerated detail in which:

FIGS. 1A to 1D is a series of four cross-sectional views illustrating the fibre according to the preferred embodiment of this invention, with each view being taken at successive positions along the lengths of the fibre;

FIG. 2 is a longitudinal sectional view of a portion of a length of fibre according to the preferred embodiment of the invention;

FIG. 3 is a longitudinal sectional view of a length of preform according to a first method of making a fibre according to the preferred embodiment of the invention;

FIGS. 4A to 4D are a series of four cross sectional views illustrating a first alternative embodiment of this invention, taken at different lengths along the fibre;

FIG. 5 is a side view of a preform for making a fibre according to the first alternative embodiment of the invention wherein the preform has been formed with a helical groove;

FIGS. 6A to 6C are a series of three cross sectional views illustrating a second alternative embodiment of this invention taken at successive positions along the lengths of the fibre;

FIGS. 7A and 7B are, respectively a longitudinal sectional view and a cross-sectional view of a preform for making a fibre according to the second alternative embodiment of the invention, with FIG. 7B being a cross sectional view taken along line 7B—7B in FIG. 7A.

DETAILED DESCRIPTION OF THE PREFERRED EMBODIMENT

Referring to FIG. 1, the optical fibre of the preferred embodiment of the invention has a single mode core 10 surrounded by an inner cladding 12 having an index of refraction less than the index of refraction of the core 10. The core 10 may be for example a fused silica core, doped with with an active lasant material. Core may also be co-doped with a suitable element such as germanium or boron to increase the photosensitivity of the core to ultra violet radiation to facilitate the writing of Bragg gratings in the core. The inner cladding 12 may be formed of fused silica, and acts as a multimode waveguide. This inner cladding may be doped with trace elements, for example fluorine or phosphorus, to modify the index of refraction to allow more flexibility in the fibre design parameters such as the numerical aperture (NA) and the dimensions of the core and cladding regions. The ratio of the area of the inner cladding to that of the core in the invention is substantially in the range of approximately twelve to four hundred to one (12–400:1). Inner cladding 12 is surrounded by an outer cladding 14 whose index of refraction is less than that of inner cladding 12. A final jacket 15 is applied to protect and strengthen the fibre.

As illustrated in FIGS. 1A to 1D and FIG. 2, the position of the core 10 in relation to the inner cladding 12 wanders along the length of the fibre. In each of the figures, the relative size and wander of the core has been exaggerated for clarity. In the progression of views in FIGS. 1A to 1D, the transverse position of core 10 within inner cladding 12 with respect to various cross sectional planes along the length of the fiber is shown in a series of views illustrating the variance in the transverse positioning of core 10 within the confines of inner cladding 12 along the length of the fibre.

In the preferred embodiment, the variation of the position of the single mode core is dictated by the absorption length of the double-clad fibre. For the case of a four level laser system, such as a double-clad fibre laser in which core 10 is doped for example with ytterbium (Yb), the length of fibre, 1, which absorbs a power, $P_a$, is given by $$l = \frac{x}{N\sigma_{ap}}\left(\log\frac{P(0)}{P(0) - P_a} + \frac{P_a}{P_s}\right) \quad (1)$$

where x is the ratio of the outer to inner core areas, N is the total number density of ytterbium ions and P(0) is the launched pump power. $P_s$ is the saturation power given by $$P_s = \frac{h\nu_p A}{(\sigma_{ep} + \sigma_{ap})\tau} \quad (2)$$

where $\sigma_{ep}$ and $\sigma_{ap}$ are the pump emission and absorption cross-sections, respectively, $\tau$ is the upper level lifetime and A is area of the inner cladding and $h\nu_p$ is the photon energy of the pump radiation. If we define a characteristic absorption length, $l_{abs}$, to be that which absorbs half of the launched pump power, then $l_{abs}$ is derived from equation (2):

$$l_{abs} = \frac{x}{N\sigma_{ap}}\left(0.3 + \frac{P(0)}{2P_s}\right) \quad (3)$$

In the preferred embodiment, the single mode core wanders a minimum distance equivalent to the diameter of the single mode core within a length of fibre given by $l_{abs}$ but may wander from this minimum up to 0.9r, where r is the radius of the inner cladding in the case of a circular geometry.

FIG. 3 illustrates a preform 16 for making fibre according to the preferred embodiment of the invention. Preform 16 comprises a single mode core 10 and a multimode cladding 12. As illustrated in FIG. 3, V-grooves 18 are machined into opposing sides of preform 16 and are offset from the opposing V-grooves by an amount equal to one half the width of the V-groove. The fibre is drawn from the preform according to methods known to those skilled in the art of drawing preforms, such as using a drawing furnace, resulting in a fibre in which the core is substantially single mode, the inner cladding is substantailly multimode and the ratio of the areas of cladding 12 to core 10 is 12 to 400:1. As a result of the V-grooves in preform 16, position of the core 10 relative to the cross sectional plane of cladding 12 varies along the length of the pulled fibre, alternating from one side of the cladding 12 to the other as illustrated, for example, in FIG. 2. As an example, an 8 mm diameter machined preform with V-grooves which are 2 mm deep and 2 mm wide may produce a fibre with a total core wander of 60 $\mu$m within a ten-meter length of drawn fibre. The core displacement may be characterized as radial as indicated by the successive positions of core 10 along radial, horizontal line 17. As best seen in FIG. 2, the variance of core 10 along cladding 12 is displaced along radial, horizontal line 17 on either side of radial, vertical line 19. An outer cladding 14, which may be a clear plastic, is applied as the fibre leaves the drawing furnace and a protective jacket 15 is thereafter applied over outer cladding 14.

It will be appreciated by those skilled in the art of pulling fibre that the grooves need not necessarily be V-shaped of a V. Other grooves shape are contemplated, as, for example, square grooves. However, V-grooves are preferred rather than square grooves, to provide a more gradual displacement of the core in the drawn fibre to reduce guiding losses in the single mode core. The displacement of the core need not necessarily be a radial displacement and any pattern of substantial displacement of the core with respect to the cross sectional plane of the inner cladding which promotes the transfer of radiation from the cladding to the core is within the scope of the invention. However, the periodicity should not be so short nor the displacement so great as to induce substantial guiding loss in the single mode core thereby negating the improvement achieved by the invention. In a fibre laser or fibre amplifier device, the longitudinal period of the wander should be less than or equal to the length of fibre required in the device.

An alternative embodiment of the fibre is shown in FIGS. 4A to 4D. It may be fabricated in much the same way as the previous embodiment except that as shown in FIG. 5, instead of V-grooves, a helical or spiral groove 21 is created in the preform 22 of sufficient width and depth that the displacement of the core 10 of the fibre drawn from this preform describes a corkscrew pattern along the length of the fibre. The resulting core displacement in the pulled fibre is illustrated in the succession of figures starting from FIGS. 4A to 4D. In this embodiment, the core displacement may be characterised as angular as shown by successive arrows 30, 32, and 34 as opposed to radial shown in FIGS. 1A to 1D.

A second alternative embodiment of this invention is shown in FIGS. 6A to 6C. Again, it may be fabricated in much the same way as the first embodiment except that preform 24, shown in FIGS. 7A and 7B, is first polished to provide a shape having a substantially rectangular cross-section. V-grooves 26 are then formed into opposing sides of the preform, as illustrated in FIG. 7A, and the fibre is thereafter drawn.

The fibre according to this invention may be used as an optical gain medium for fibre amplifiers or fibre lasers. In the former, the pump radiation from, for example, a large area stripe diode is launched into the inner cladding with high coupling efficiency and subsequently absorbed in the doped core creating a high gain environment at a wavelength characteristic of the active dopant. Radiation at the signal wavelength is launched into the core and is amplified during a single pass through the fibre.

In the case of a fibre laser, reflective media at each end of the fibre provide optical feedback creating a resonant cavity. Lasing is achieved in the doped core when the intensity of the pump radiation creates sufficient gain to overcome the intrinsic loss of the cavity. The reflective media may consist of bulk dielectric mirrors abutted directly against the end facets of the fibre, or fused-tapered wavelength de-multiplexers (WDM's) or reflective Bragg gratings.

In both of the foregoing embodiments the numerical aperture (NA) of the inner cladding should be substantially in the range 0.2–0.4 to allow efficient coupling to high power, broad stripe laser diode pump sources, which typically have high NA's. The geometry and dimensions of the inner cladding may also be matched to that of the pump source to further maximize coupling efficiency. The diameter of the core should be chosen to be as large as possible, within the fibre design restrictions necessary for substantially single mode behaviour in the core, to provide as large an area as possible to intercept radiation propagating along the inner cladding.

Fibre according to the invention is also advantageous for fibre lasers incorporating double-doped double-clad fibre as described in U.S. Pat. No. 5,291,501 by Hanna. In this fibre design, both the core and the inner cladding are doped with active lasant material, different from each other. Appropriate pump radiation is launched into the inner cladding and lasing is induced in the inner cladding. This lasing emission then serves as the pump radiation for the optical fibre core which then also lases. The wandering core configuration of the inventive fibre would greatly enhance the transfer of radiation from the inner cladding to the fibre core improving device performance.

It will be appreciated from the foregoing that optical fibre according to the invention provides improved efficiency in coupling multimode radiation into a single mode core. It will also be appreciated that variations to the preferred and alternative embodiments described herein may be practiced without departing from the scope of the invention.

What is claimed is:

1. A method of making a double-clad optical fibre comprising a substantially single mode core, with an index of refraction $n_1$, an inner multimode cladding surrounding said core, with an index of refraction $n_2$, and an outer cladding surrounding said inner multimode cladding, with an index $n_3$ where $n_3 < n_2 < n_1$, the position of said core relative to the cross sectional plane of the inner cladding varies continuously along the length of the fibre so that multimode radiation which is launched into said inner multimode cladding is efficiently coupled into said core, comprising the steps of:

a) providing a fibre preform of determined length having a core doped with an active lasant material and a multimode inner cladding surrounding said core;

b) forming a series of opposing offset V-grooves along the length of said preform;

c) drawing said preform into a fibre in which said fibre core is substantially single mode and said fibre inner cladding is substantially multimode and the ratio of areas of said fibre inner cladding to said fibre core is 12:1 to 400:1; and d) forming an outer coating on the drawn fibre.

2. A method of increasing the coupling efficiency between a core and an inner cladding surrounding the core of an optical fibre comprising the steps of:

a) providing a fibre preform of elongated length having a core doped with an active lasant material and a multimode inner cladding surrounding said core;

b) forming a perturbation in an outside surface of said preform inner cladding along the elongated length of said preform with the perturbation extending in a direction transverse to the elongated length of said preform; and c) drawing said preform into a fibre, the preform perturbation producing a continuously meandering of the fibre core within the fibre inner cladding along the length of the fibre as the fibre is drawn from the preform.

3. The method of claim 2 wherein the ratio of areas of said fibre inner cladding to said fibre core in the drawn fibre is in the range of 12:1 to 400:1.

4. The method of claim 2 wherein the step of forming a perturbation along an outside surface of the fibre preform is accomplished by forming at least one groove along the outside surface of the fibre preform.

5. The method of claim 4 wherein the step of forming the groove comprises of forming a plurality of grooves along opposing sides of the fibre preform outside surface.

6. The method of claim 5 wherein said grooves are V-shaped.

7. The method of claim 4 wherein the step of forming the groove comprises the step of forming a helical groove along the surface of the fibre preform.

8. The method of claim 7 wherein said groove is V-shaped.

9. A method of increasing the coupling efficiency between a core and an inner cladding surrounding the core of an optical fibre comprising the steps of:

a) providing a fibre preform of elongated length having a core doped with an active lasant material and a multimode inner cladding surrounding said core;

b) forming grooves in an outside surface of said preform inner cladding along the elongated length of said preform with the grooves extending in a direction transverse to the elongated length of said preform; and c) drawing said preform into a linearly formed fibre with its core continuously meandering transversely along the length of the fibre inner cladding as the fibre is drawn from the preform.

10. The method of claim 9 wherein the ratio of areas of said fibre inner cladding to said fibre core is in the range of 12:1 to 400:1.

11. The method of claim 9 wherein said grooves have a cross sectional V-shape.

12. The method of claim 9 wherein said grooves are formed along opposing sides of the fibre preform outside surface.

* * * * *